(12) United States Patent
Miyano

(10) Patent No.: US 8,718,464 B2
(45) Date of Patent: May 6, 2014

(54) VIEW FINDER AND CAMERA

(71) Applicant: FUJIFILM Corporation, Tokyo (JP)

(72) Inventor: Hitoshi Miyano, Saitama-ken (JP)

(73) Assignee: Fujifilm Corporation, Tokyo (JP)

( * ) Notice: Subject to any disclaimer, the term of this patent is extended or adjusted under 35 U.S.C. 154(b) by 0 days.

(21) Appl. No.: 13/906,957

(22) Filed: May 31, 2013

(65) Prior Publication Data

US 2013/0266302 A1 Oct. 10, 2013

Related U.S. Application Data

(63) Continuation of application No. PCT/JP2011/007009, filed on Dec. 15, 2011.

(30) Foreign Application Priority Data

Dec. 20, 2010 (JP) ................................. 2010-282895

(51) Int. Cl.
*G03B 13/06* (2006.01)
*G03B 13/14* (2006.01)
*H04N 5/225* (2006.01)

(52) U.S. Cl.
USPC ........... 396/374; 396/377; 396/379; 396/384; 396/385; 348/333.09; 348/341

(58) Field of Classification Search
USPC ................. 396/374, 373, 377–379, 384, 385; 348/333.09, 341
See application file for complete search history.

(56) References Cited

U.S. PATENT DOCUMENTS

| 5,546,227 | A | 8/1996 | Yasugaki et al. |
| 5,706,136 | A | 1/1998 | Okuyama et al. |
| 5,793,339 | A | 8/1998 | Takahashi |
| 5,991,103 | A | 11/1999 | Togino |
| 2004/0090666 | A1 * | 5/2004 | Minakata ..................... 359/363 |
| 2005/0052756 | A1 | 3/2005 | Tamura et al. |
| 2009/0290225 | A1 | 11/2009 | Asakura et al. |

FOREIGN PATENT DOCUMENTS

| JP | H06-250113 | 9/1994 |
| JP | H07-234376 | 9/1995 |
| JP | H07-281256 | 10/1995 |
| JP | H08-122670 | 5/1996 |
| JP | H08-234137 | 9/1996 |
| JP | H08-240773 | 9/1996 |
| JP | H08-286144 | 11/1996 |
| JP | 2000-330039 | 11/2000 |
| JP | 2001-209001 | 8/2001 |
| JP | 2002-311378 | 10/2002 |
| JP | 2005-084284 | 3/2005 |
| JP | 2007-264179 | 10/2007 |
| JP | 2009-282181 | 12/2009 |

* cited by examiner

*Primary Examiner* — Rochelle-Ann J Blackman
(74) *Attorney, Agent, or Firm* — Young & Thompson

(57) ABSTRACT

The view finder includes an observation optical system for enlarged observation of information displayed on a display section. The observation optical system includes an optical path bending member for bending the optical path. The view finder is configured such that an angle formed between a principal ray of a maximum angle of view and the display section is in the range of 90±5 degrees.

8 Claims, 11 Drawing Sheets

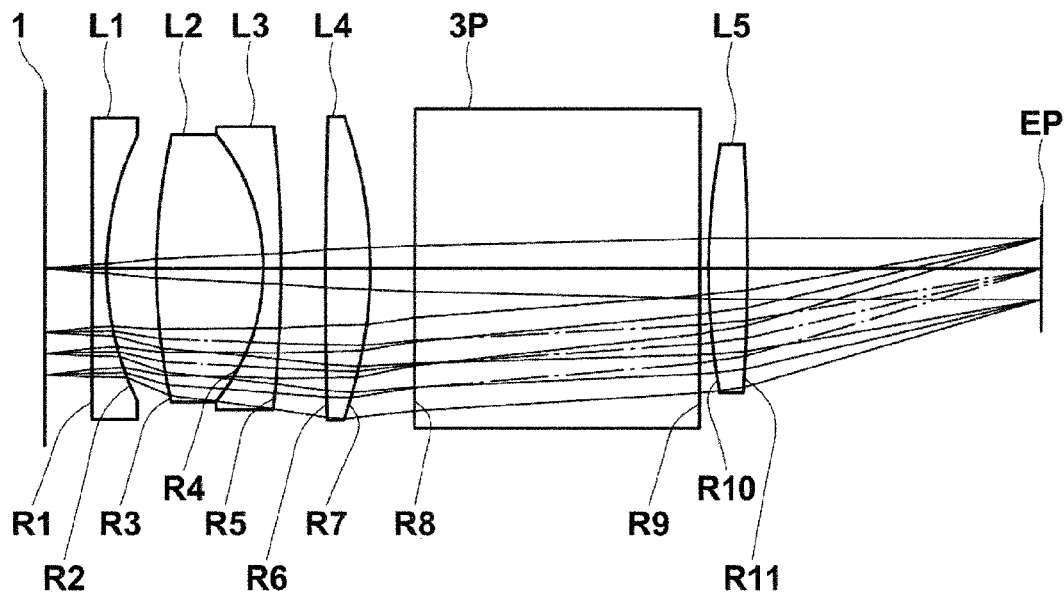
FIG.3 EXAMPLE 1
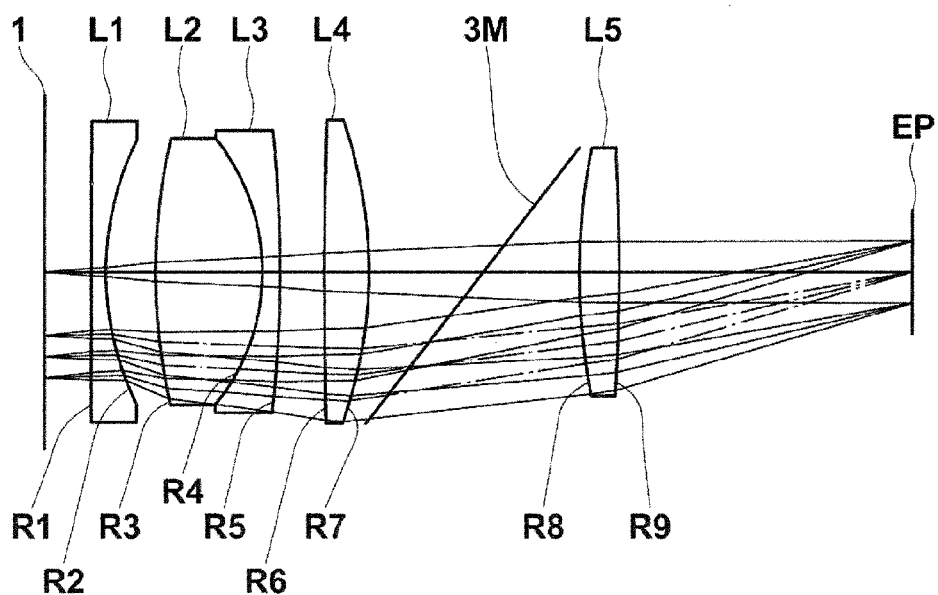
FIG.4 EXAMPLE 2

EXAMPLE 5

EXAMPLE 6

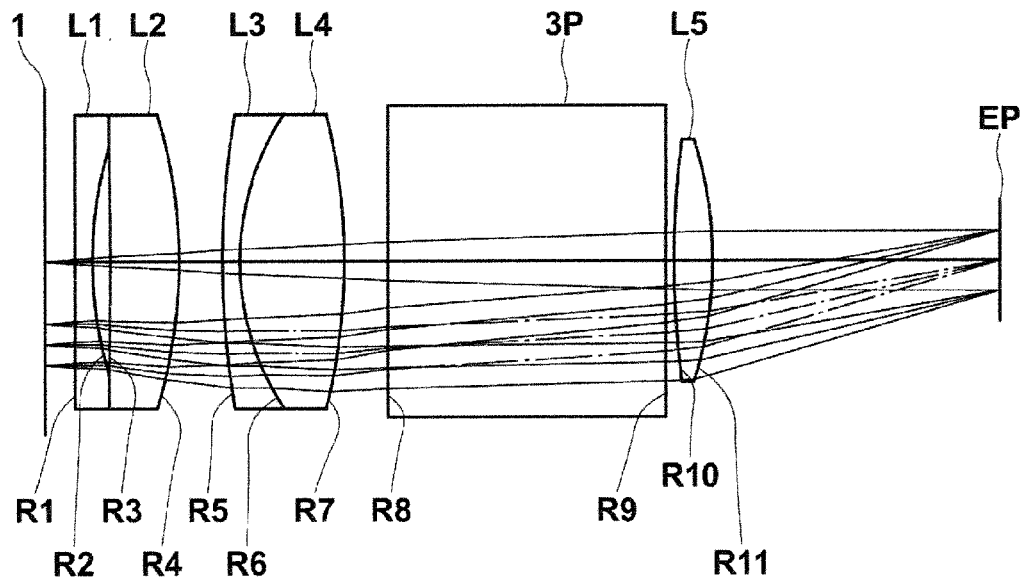
FIG.9 EXAMPLE 7
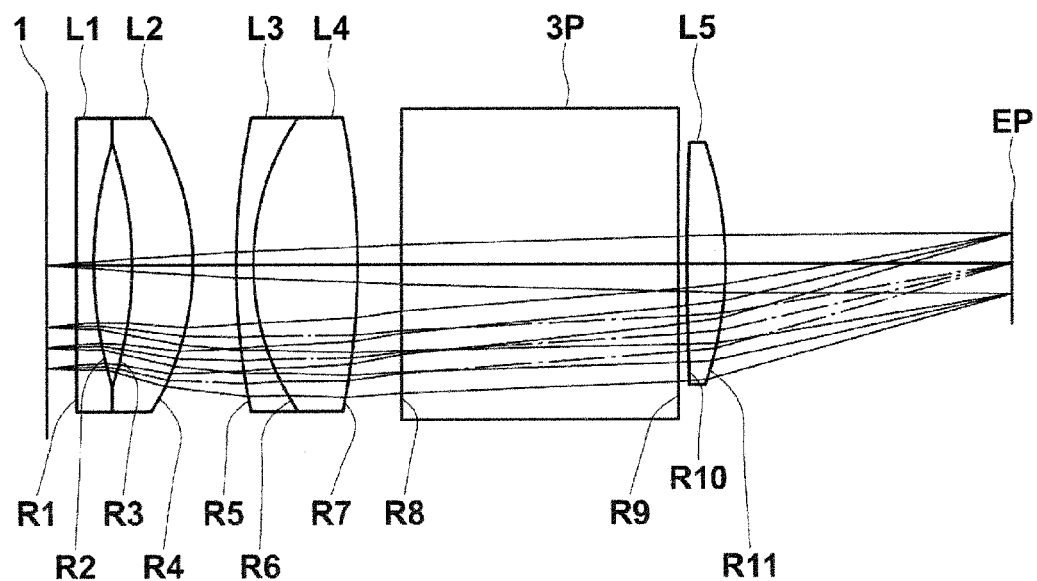
FIG.10 EXAMPLE 8

FIG.11 EXAMPLE 9
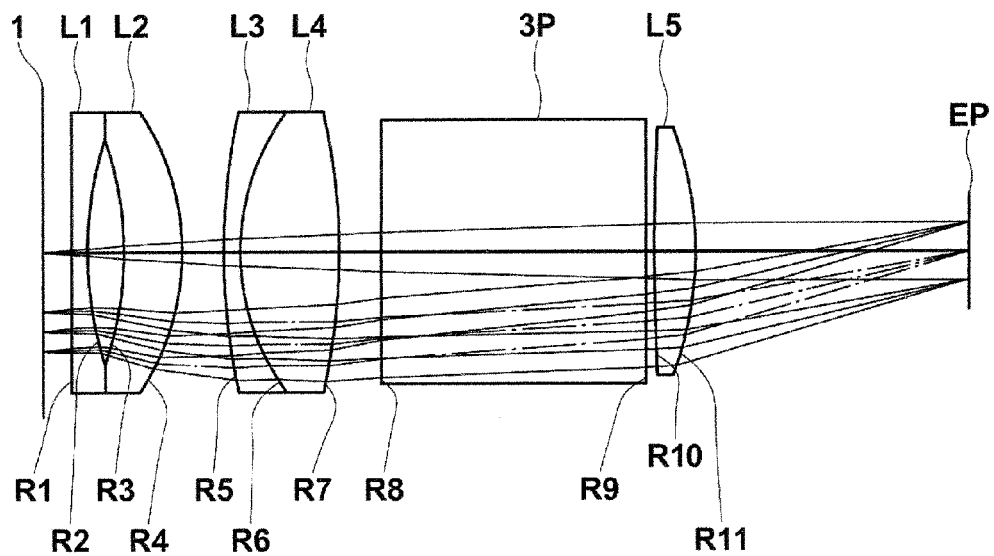
FIG.12 EXAMPLE 10
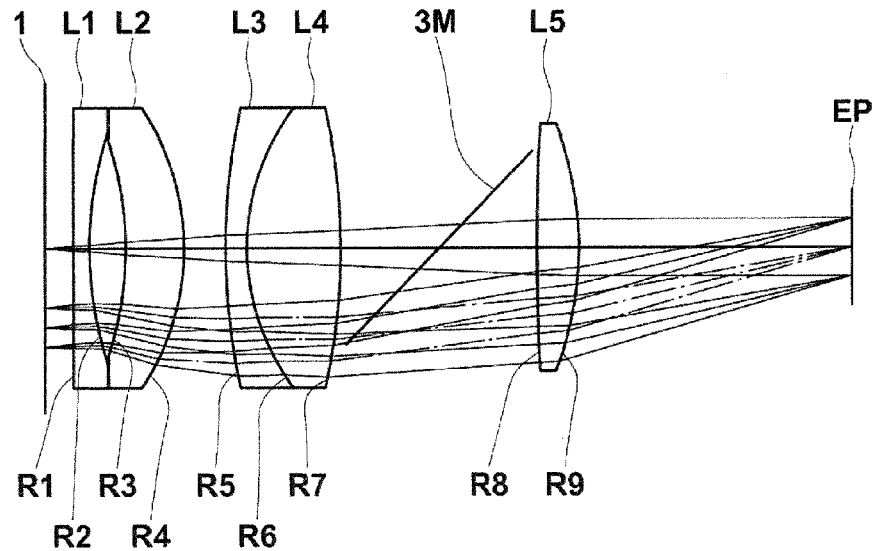

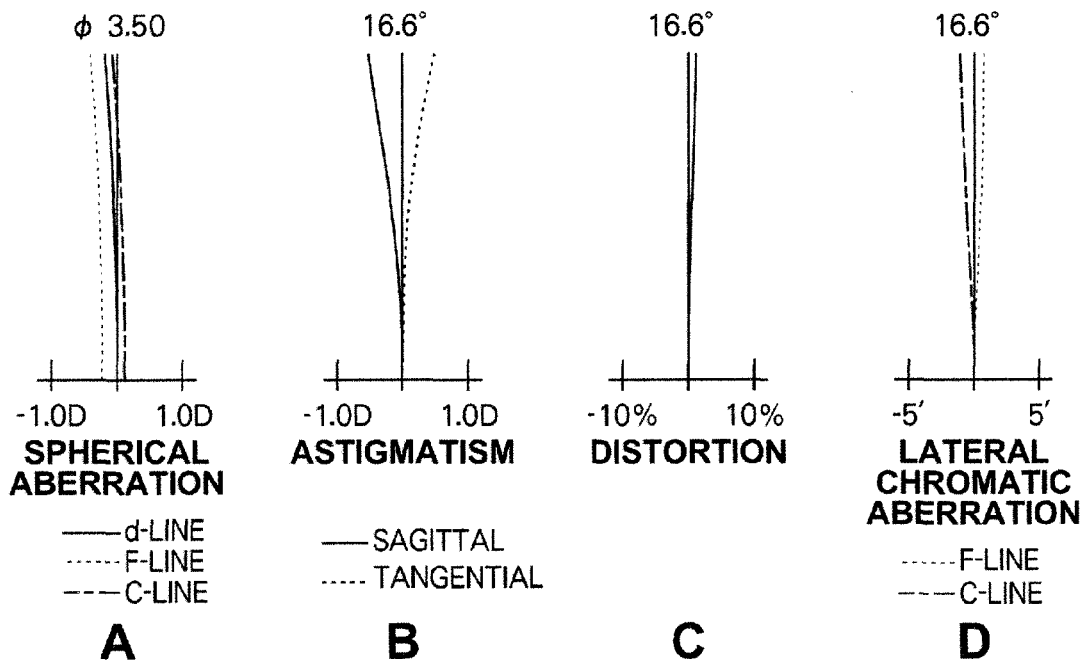
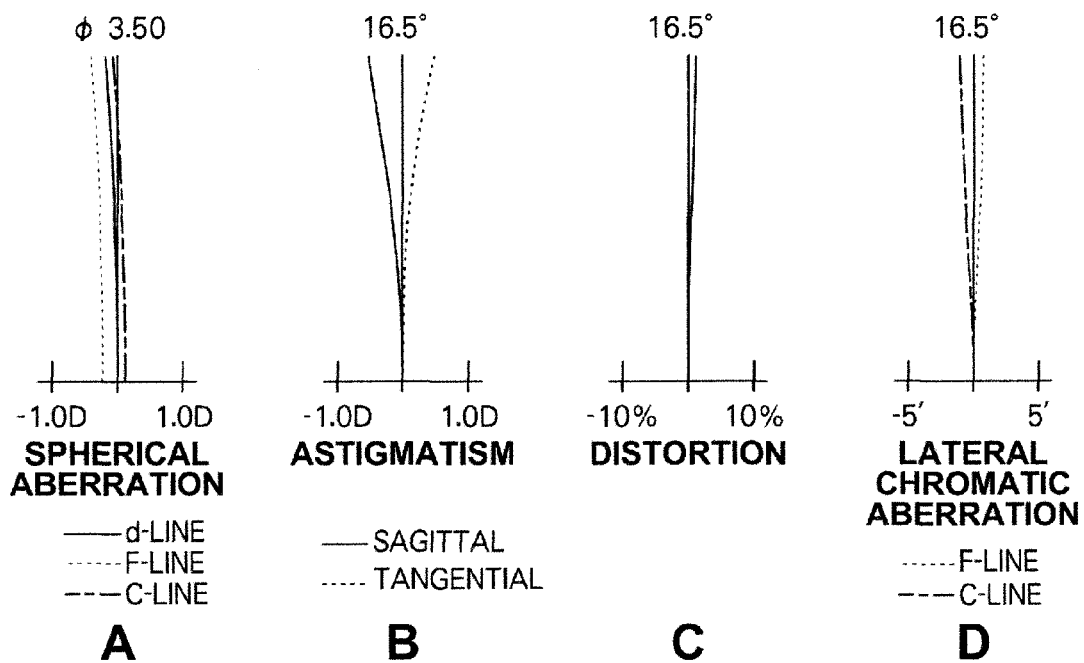

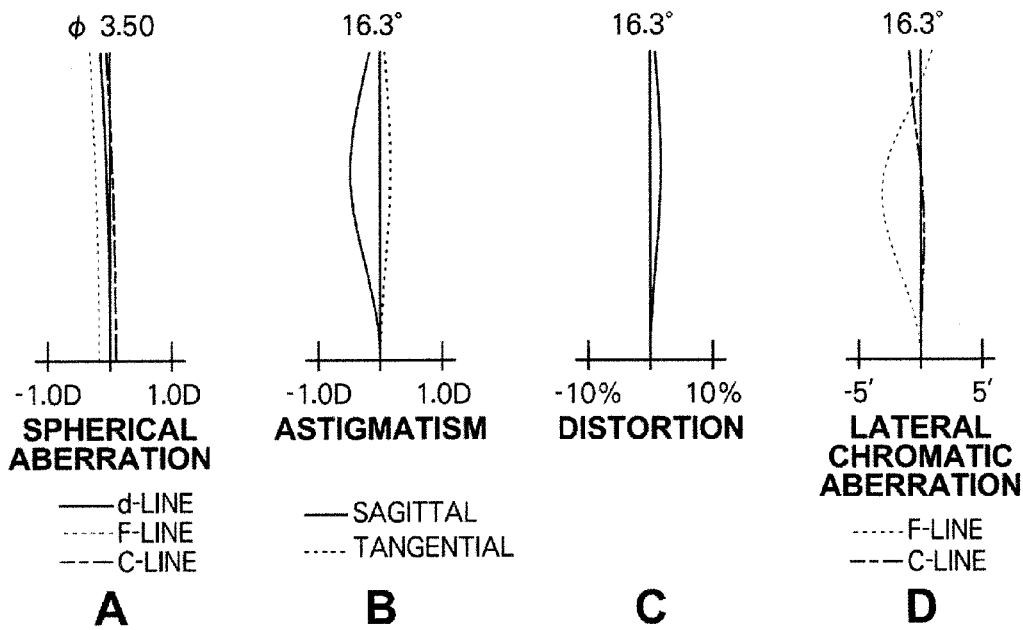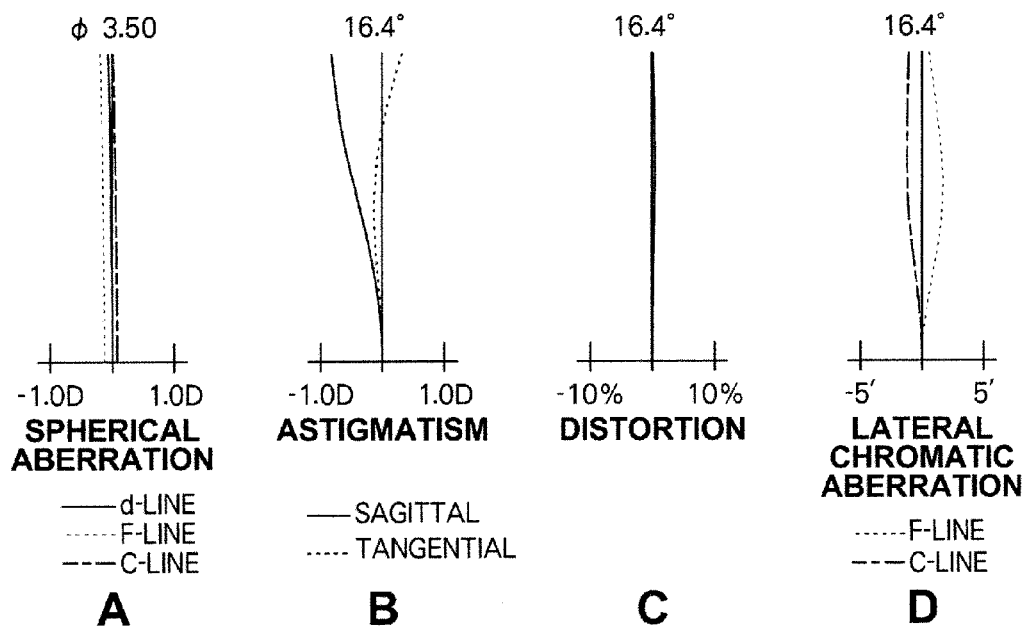

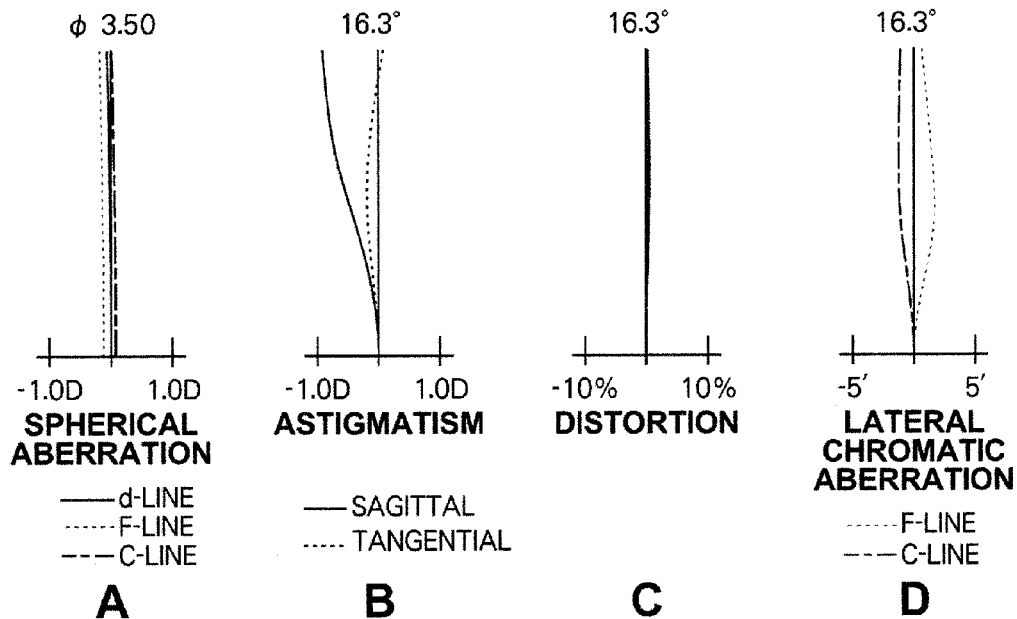
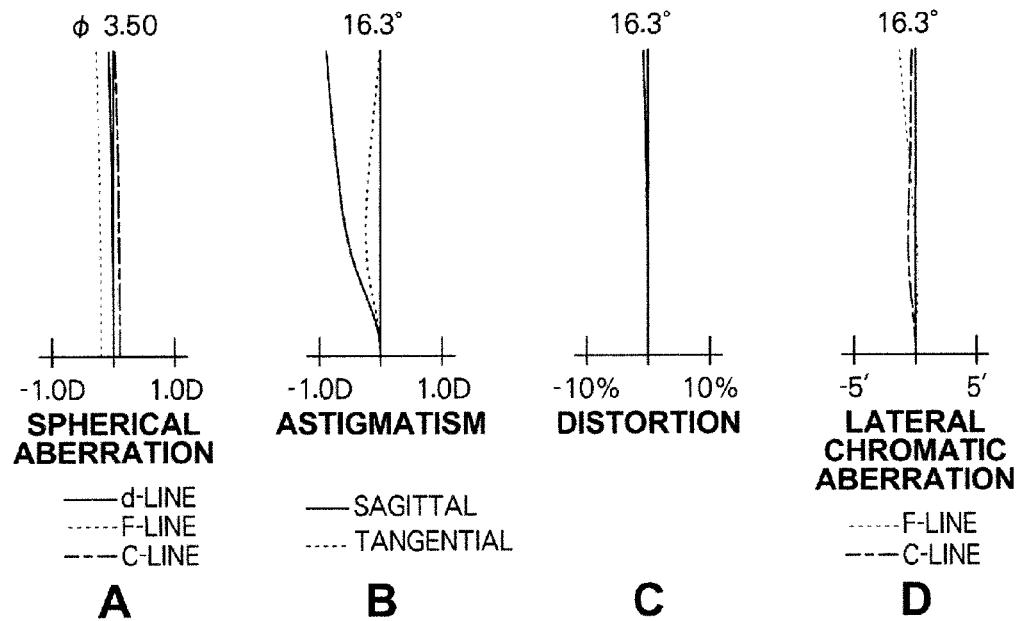

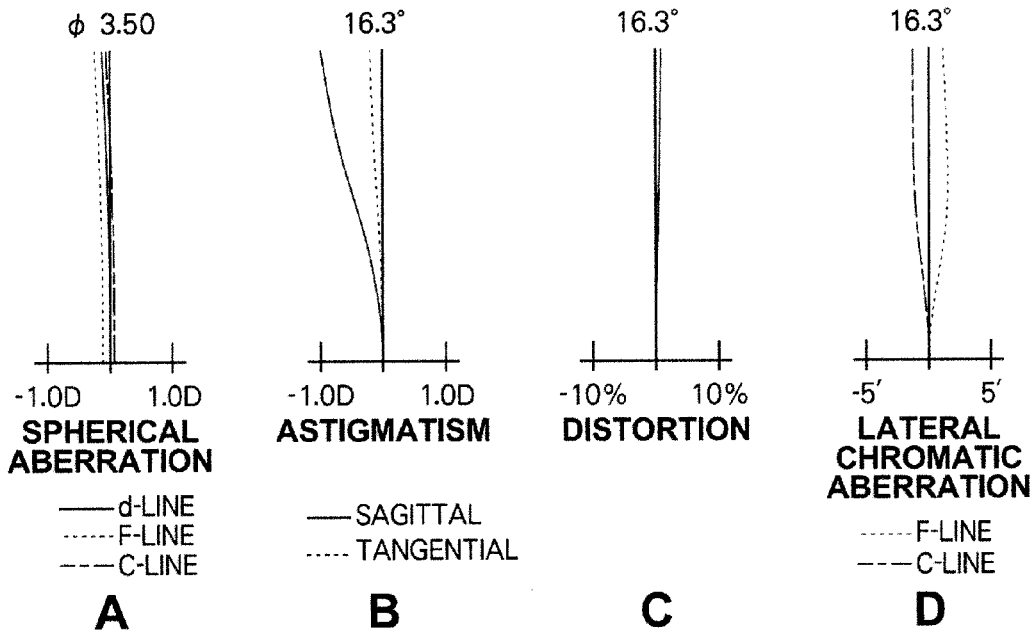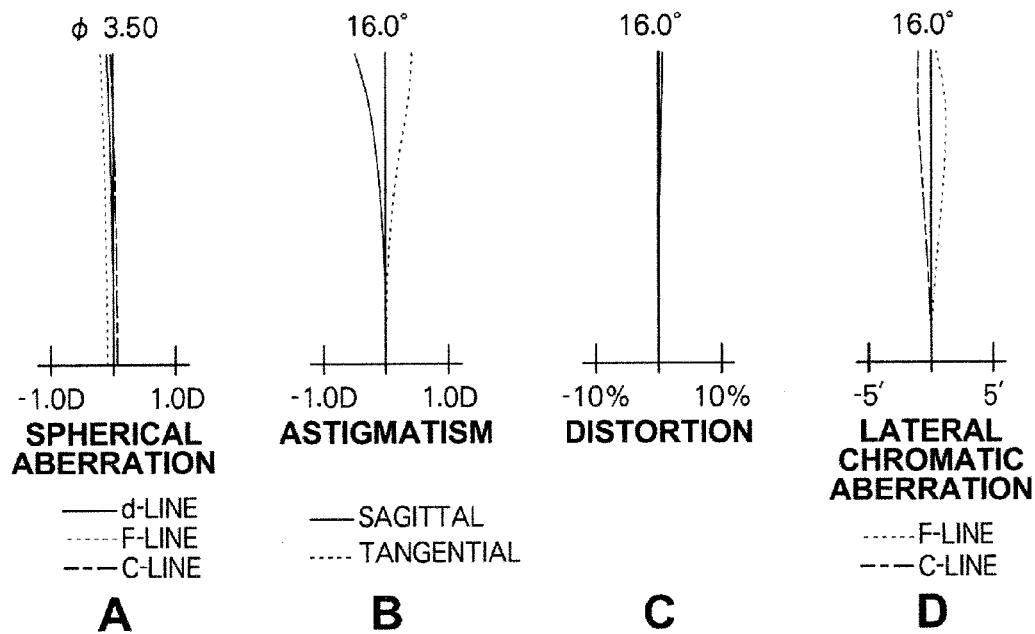

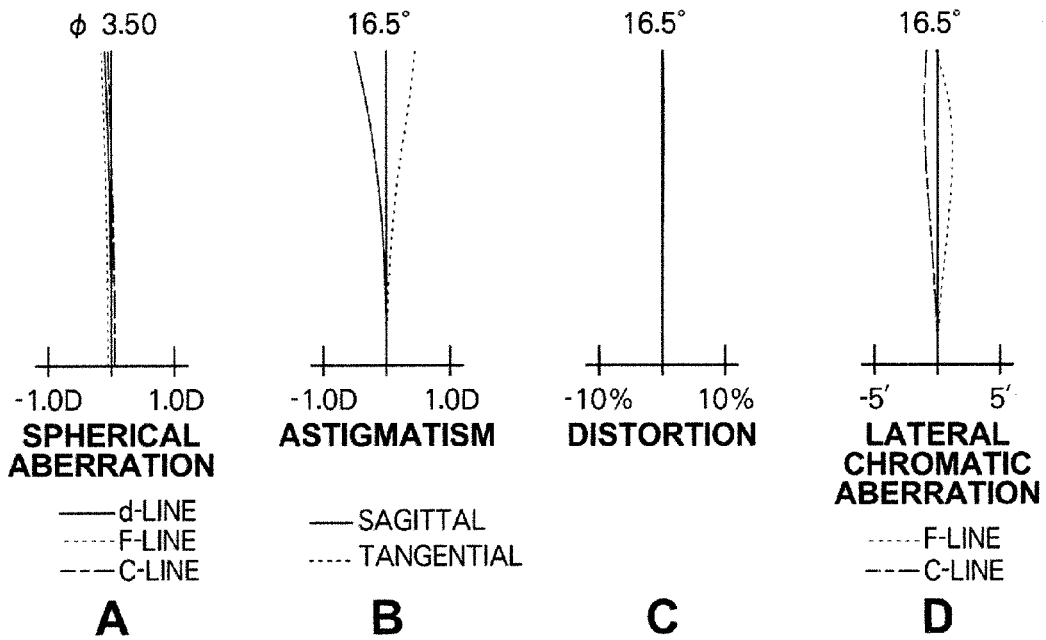
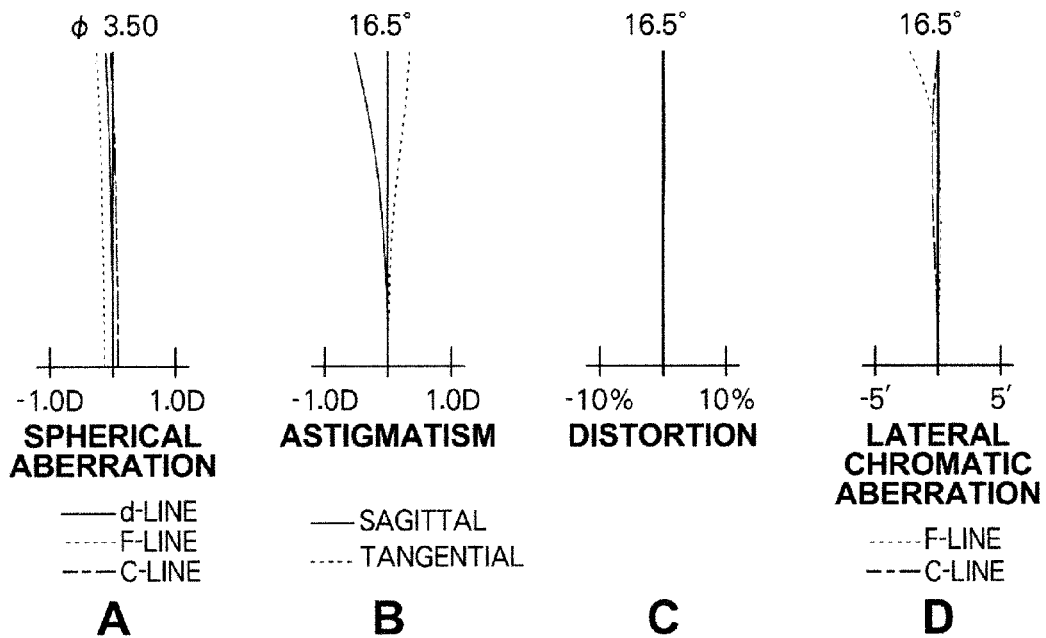

VIEW FINDER AND CAMERA

TECHNICAL FIELD

The present invention relates to a view finder and a camera, and more particularly to a view finder that provides enlarged observation of information displayed on a liquid crystal display device, or the like, and a camera equipped with the view finder.

BACKGROUND ART

Conventionally, as finder devices for cameras, various finder devices that provide enlarged observation of a display screen of information, such as imaging conditions, displayed on a liquid crystal display device in the same principle as that of a loupe, have been proposed. For example, Japanese Unexamined Patent Publication No. 7 (1995)-281256 discloses a finder device, where image information displayed on a liquid crystal panel is observed via an eyepiece having positive refractive power.

DISCLOSURE OF INVENTION

In recent years, there are strong demands for size reduction of cameras, and in particular, the size reduction in the thickness direction is being focused. However, the main stream of conventional view finders is those where elements between the display section, such as a liquid crystal display device, and the eye of the observer are arranged along a straight line. Therefore, the configuration of the view finder is one of problems in achieving the thickness reduction of cameras. The size reduction may easily be achieved by reducing the number of lenses forming a view finder. However, in this case, image quality of an observed image is degraded. Many of conventional finder devices only display a field of view frame and a target mark for distance measurement; whereas, among recent view finders employing a liquid crystal display device, more and more view finders display a taken image, and therefore providing a good image is also important.

In view of the above-described circumstances, the present invention is directed to providing a view finder that allows size reduction, in particular, thickness reduction, of a camera, on which the view finder is mounted, while ensuring a good image, and a camera provided with the view finder.

A view finder of the invention is a view finder including an observation optical system for enlarged observation of information displayed on a display section, wherein the observation optical system includes an optical path bending member for bending an optical path, and an angle formed between a principal ray of a maximum angle of view and the display section is in the range of 90±5 degrees.

The display section may, for example, be a display screen of a liquid crystal display device.

The "principal ray of a maximum angle of view" refers to a light beam, among light beams contained in a light flux of the maximum angle of view, which intersects the optical axis at an eye point that is set when the view finder is designed.

The view finder of the invention may include a positive lens group for diopter correction disposed between the display section and the optical path bending member, the positive lens group being moved along the optical axis direction to achieve the diopter correction, wherein it is preferred that conditional expression (1) below is satisfied:

$$1.60 < fc/fL < 2.50 \tag{1},$$

where fc is a focal length of the positive lens group, and fL is a focal length of the observation optical system.

The positive lens group for diopter correction may be formed by a single lens or a plurality of lenses.

The view finder of the invention may include one positive lens disposed nearer to the eye point than the optical path bending member, the one positive lens being fixed relative to the optical path bending member, wherein it is preferred that conditional expression (2) below is satisfied:

$$1.5 < fe/fL < 4.0 \tag{2},$$

where fe is a focal length of the positive lens, and fL is a focal length of the observation optical system.

The view finder of the invention may include a most display section-side lens in the observation optical system, the most display section-side lens having an absolute value of a radius of curvature of an eye point-side surface thereof smaller than that of a display section-side surface thereof, wherein it is preferred that conditional expression (3) below is satisfied:

$$-1.5 < fo/fL < -0.95 \tag{3},$$

where fo is a focal length of the most display section-side lens, and fL is a focal length of the observation optical system.

The view finder of the invention may include a cemented lens formed by a positive lens and a negative lens cemented together, the cemented lens being not movable during diopter correction, wherein it is preferred that conditional expression (4) below is satisfied:

$$25 < (vpk - vnk)/(Rck/fL) < 40 \tag{4},$$

where vpk and vnk are Abbe numbers with respect to the d-line of the positive lens and the negative lens forming the cemented lens, respectively, Rck is an absolute value of a radius of curvature of a cemented surface of the cemented lens, and fL is a focal length of the observation optical system.

Alternatively, the view finder of the invention may include a cemented lens formed by a positive lens and a negative lens cemented together, the cemented lens being movable during diopter correction, wherein it is preferred that conditional expression (5) below is satisfied:

$$40 < (vps - vns)/(Rcs/fL) < 50 \tag{5}$$

where vps and vns are Abbe numbers with respect to the d-line of the positive lens and the negative lens forming the cemented lens, respectively, Rcs is an absolute value of a radius of curvature of a cemented surface of the cemented lens, and fL is a focal length of the observation optical system.

It should be noted that, if there is an optical member that has no refractive power, such as a prism, in the optical path, corresponding values of the conditional expressions (1) to (5) are calculated with converting the thickness of the optical member that has no refractive power into air of the same thickness.

It should be noted that, if any of above-described lenses is an aspheric lens, "positive" or "negative" with respect to the refractive power of the lens is that of the paraxial region.

A camera of the invention includes the above-described view finder of the invention.

According to the view finder of the invention, bending the optical path allows reducing the length in the thickness direction of a camera, on which the view finder is mounted, without reducing the number of lenses, when compared to conventional view finders where elements between the display section and the eye of the observer are arranged along a straight line. Further, according to the view finder of the invention, the number of lenses can be increased without increasing the length in the thickness direction of a camera, and this allows providing an even better image. Still further, according to the view finder of the invention, configuring the view finder such that an angle formed between a principal ray of a maximum angle of view and the display section is in the range of 90±5 degrees allows providing a good image even in the case where the display section is angle dependent.

According to the camera of the invention, which includes the view finder of the invention, thickness reduction of the camera can be achieved while ensuring a good observed image through the finder.

BRIEF DESCRIPTION OF THE DRAWINGS

FIG. 3 is a sectional view illustrating the configuration of a view finder of Example 1 of the invention, FIG. 4 is a sectional view illustrating the configuration of a view finder of Example 2 of the invention, FIG. 9 is a sectional view illustrating the configuration of a view finder of Example 7 of the invention, FIG. 10 is a sectional view illustrating the configuration of a view finder of Example 8 of the invention, FIG. 11 is a sectional view illustrating the configuration of a view finder of Example 9 of the invention, FIG. 12 is a sectional view illustrating the configuration of a view finder of Example 10 of the invention, FIG. 13 shows aberration diagrams of the view finder of Example 1 of the invention, where a spherical aberration diagram is shown at A, an astigmatism diagram is shown at B, a distortion diagram is shown at C and a lateral chromatic aberration diagram is shown at D, FIG. 14 shows aberration diagrams of the view finder of Example 2 of the invention, where a spherical aberration diagram is shown at A, an astigmatism diagram is shown at B, a distortion diagram is shown at C and a lateral chromatic aberration diagram is shown at D, FIG. 15 shows aberration diagrams of the view finder of Example 3 of the invention, where a spherical aberration diagram is shown at A, an astigmatism diagram is shown at B, a distortion diagram is shown at C and a lateral chromatic aberration diagram is shown at D, FIG. 16 shows aberration diagrams of the view finder of Example 4 of the invention, where a spherical aberration diagram is shown at A, an astigmatism diagram is shown at B, a distortion diagram is shown at C and a lateral chromatic aberration diagram is shown at D, FIG. 17 shows aberration diagrams of the view finder of Example 5 of the invention, where a spherical aberration diagram is shown at A, an astigmatism diagram is shown at B, a distortion diagram is shown at C and a lateral chromatic aberration diagram is shown at D, FIG. 18 shows aberration diagrams of the view finder of Example 6 of the invention, where a spherical aberration diagram is shown at A, an astigmatism diagram is shown at B, a distortion diagram is shown at C and a lateral chromatic aberration diagram is shown at D, FIG. 19 shows aberration diagrams of the view finder of Example 7 of the invention, where a spherical aberration diagram is shown at A, an astigmatism diagram is shown at B, a distortion diagram is shown at C and a lateral chromatic aberration diagram is shown at D, FIG. 20 shows aberration diagrams of the view finder of Example 8 of the invention, where a spherical aberration diagram is shown at A, an astigmatism diagram is shown at B, a distortion diagram is shown at C and a lateral chromatic aberration diagram is shown at D, FIG. 21 shows aberration diagrams of the view finder of Example 9 of the invention, where a spherical aberration diagram is shown at A, an astigmatism diagram is shown at B, a distortion diagram is shown at C and a lateral chromatic aberration diagram is shown at D, and FIG. 22 shows aberration diagrams of the view finder of Example 10 of the invention, where a spherical aberration diagram is shown at A, an astigmatism diagram is shown at B, a distortion diagram is shown at C and a lateral chromatic aberration diagram is shown at D.

DESCRIPTION OF PREFERRED EMBODIMENTS

Figure 1:
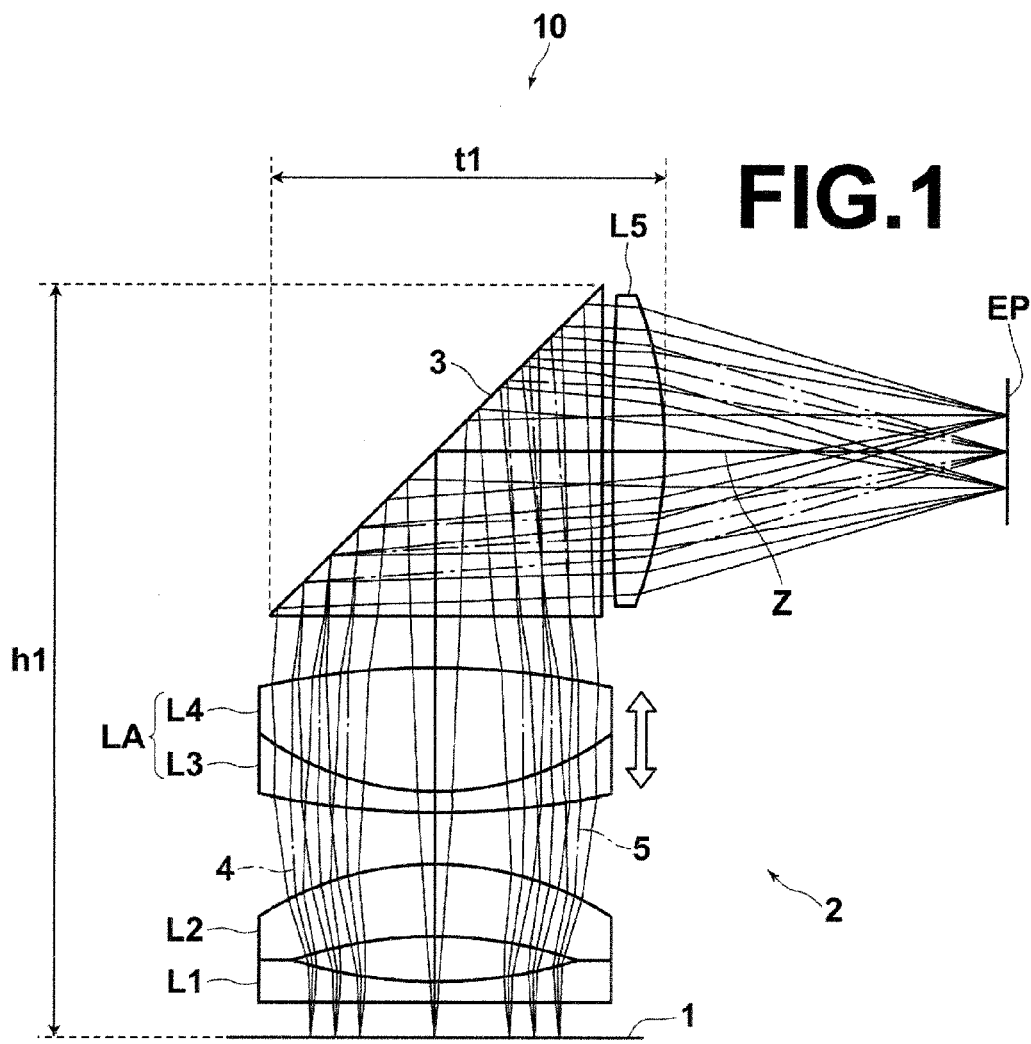
FIG. 1 is a sectional view illustrating the configuration of a view finder according to a first embodiment of the present invention.
Figure 2:
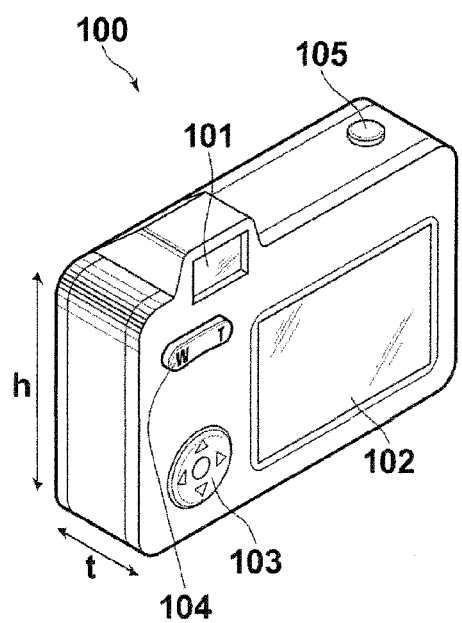
FIG. 2 is a perspective view illustrating the schematic configuration of a camera according to an embodiment of the invention.
Figure 5:
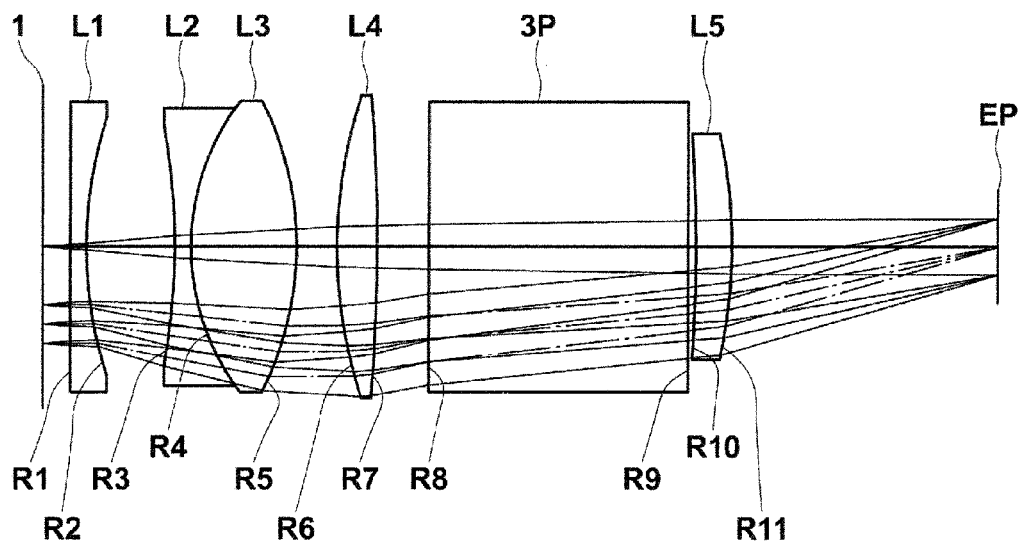
FIG. 5 is a sectional view illustrating the configuration of a view finder of Example 3 of the invention.
Figure 6:
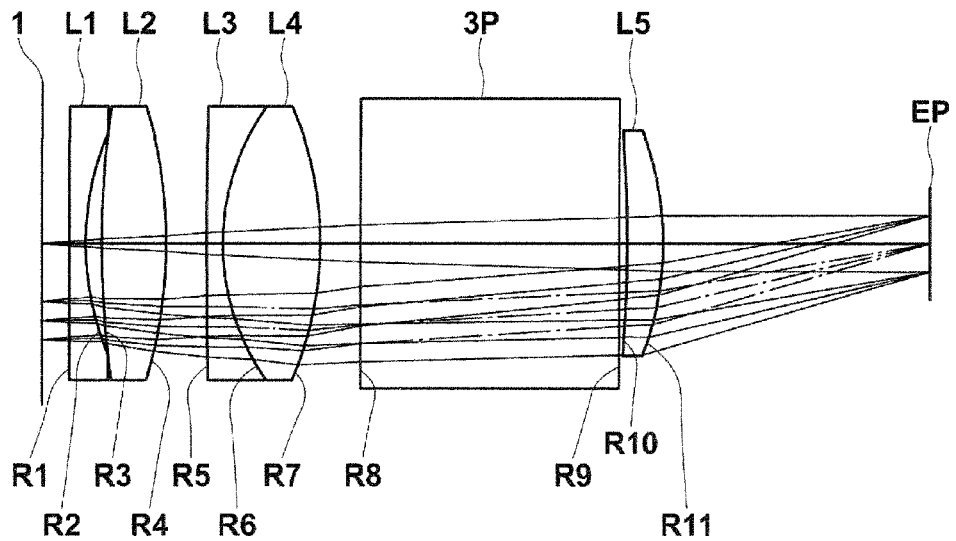
FIG. 6 is a sectional view illustrating the configuration of a view finder of Example 4 of the invention.
Figure 7:
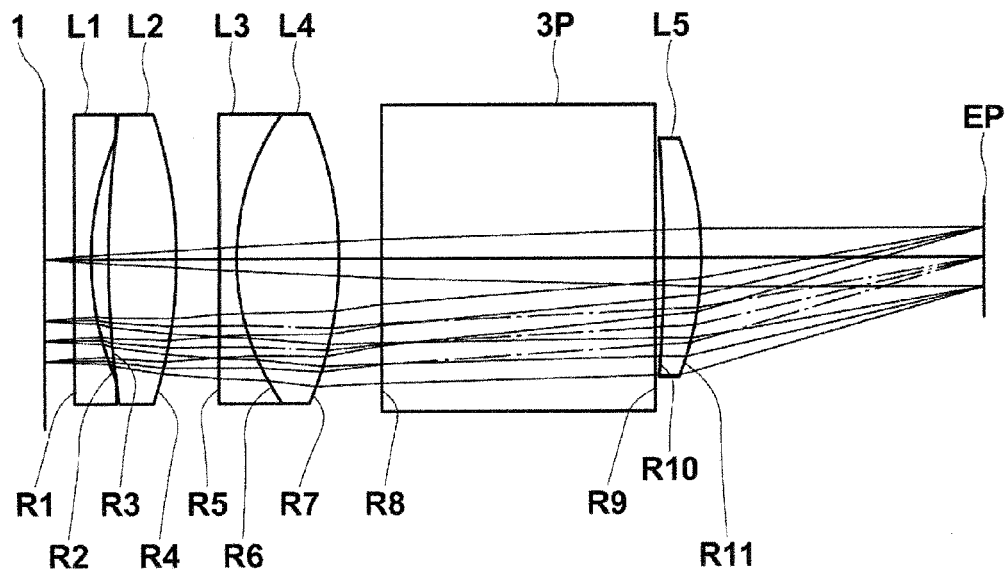
FIG. 7 is a sectional view illustrating the configuration of a view finder of Example 5 of the invention.
Figure 8:
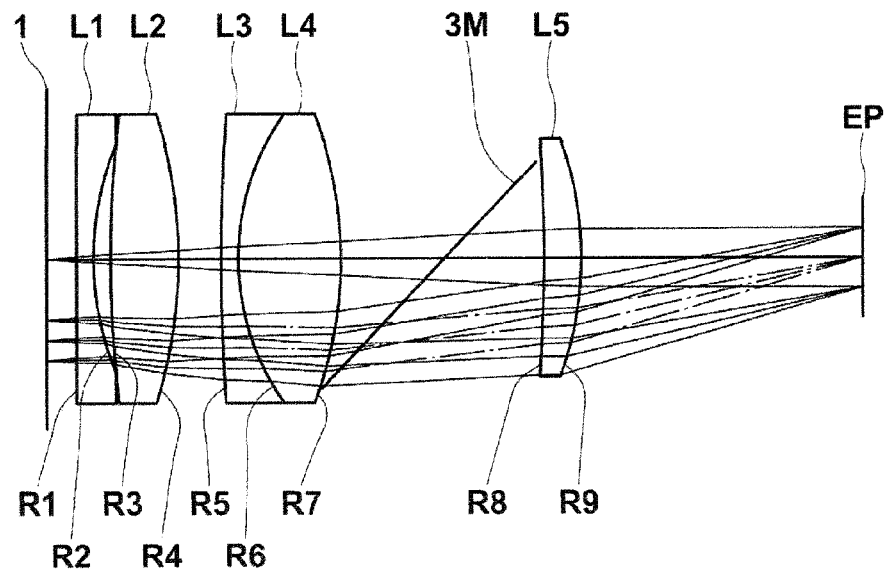
FIG. 8 is a sectional view illustrating the configuration of a view finder of Example 6 of the invention.

Hereinafter, an embodiment of the present invention will be described in detail with reference to the drawings. FIG. 1 shows the configuration of a view finder 10 according to one embodiment of the invention. FIG. 2 shows a rear side perspective view of a camera 100, which is one example of an imaging device on which the view finder 10 is mounted.

First, the schematic configuration of the camera 100 is described with reference to FIG. 2. The camera includes an imaging lens (not shown) for taking an image at the front side of and inside the camera body. The camera 100 includes the view finder 10 according to the embodiment of the invention inside the camera body, and includes an observation window 101 for the view finder 10 at the upper portion of the camera body.

Further, the camera 100 includes, at the rear side of the camera body, a monitor 102 for displaying images and various setting screens, an operation button 103 used to perform various setting, and a zoom lever 104 used to change the magnification, and also includes a shutter button 105 on the top side of the camera body. It should be noted that, while the camera 100 shown in FIG. 1 is a digital camera, the present invention is also applicable to film cameras. The arrow t in FIG. 2 indicates the thickness direction of the camera 100, and the arrow h in FIG. 2 indicates the height direction of the camera 100.

The view finder 10 shown in FIG. 1 includes a display section 1, and an observation optical system 2 for providing enlarged observation of information, which is displayed on the display section 1, at an eye point EP. The display section 1 may, for example, be a display screen of a liquid crystal display device, a display member provided with a field of view frame, etc. Examples of the information to be displayed on the display section 1 may include a field of view frame, a distance measurement range, a photometric range, an aperture value, a shutter speed, an exposure value, the number of taken images, taken images, etc.

In the view finder 10, the observation optical system 2 functions similarly to a loupe. The observation optical system 2 is formed by a lens L1, a lens L2, a lens L3, a lens L4, an optical path bending member 3 and a lens L5, which are disposed in this order from the display section 1 side to the eye point side.

The optical path bending member 3 bends the optical path from the display section 1 to the eye point EP to provide a bending optical system. The optical path bending member 3 of the example shown in FIG. 1 employs a reflective member that is formed by a prism having a triangular cross section. It should be noted that the optical path bending member 3 is not limited to a prism, and any member that is capable of bending the optical path, such as a mirror or a reflective member having the similar function, may be used.

While the optical path is bent at right angle by the optical path bending member 3 in the example shown in FIG. 1, the bend angle of the optical path is not necessarily limited to right angle. It is preferred to set the bend angle of the optical path appropriately depending on the configuration of the camera on which the view finder 10 is mounted.

Bending the optical path in the view finder 10 allows compact configuration. As shown in FIG. 1, in a cross section including the optical axis Z, a space required by the view finder 10 is represented by t1 in the horizontal direction and h1 in the vertical direction.

The view finder 10 is mounted on the camera 100 such that the direction of t1 shown in FIG. 1 is aligned with the thickness direction t shown in FIG. 2. Therefore, the view finder 10 of this embodiment allows making the camera 100 significantly thinner than a camera with a view finder where elements between the display section and the eye point are arranged along a straight line.

Further, the view finder 10 of this embodiment is configured such that an angle formed between a principal ray 4, 5 of a light flux of the maximum angle of view and the display section 1 is in the range of 90±5 degrees. This configuration allows observing a good image with reducing degradation of color reproducibility and shading even in the case where the display section 1 is angle dependent, such as where the display section 1 is a display screen of a liquid crystal display device. In order to obtain an even better image when the angle-dependent display section 1 is used, the angle formed between the principal ray 4, 5 of the light flux of the maximum angle of view and the display section 1 is more preferably in the range of 90±4 degrees, and even more preferably in the range of 90±3 degrees.

It is preferred that a finder device includes a mechanism for performing diopter correction. In the view finder 10 of this embodiment, a positive lens group, which is moved along the optical axis direction to achieve the diopter correction, is disposed between the display section 1 and the optical path bending member 3. In the example shown in FIG. 1, a cemented lens LA formed by the negative lens L3 and the positive lens L4 cemented together corresponds to the positive lens group for diopter correction.

In many of conventional finders, the lens for diopter correction is disposed in the nearest position to the eye point. With such a configuration, the thickness of a camera is increased by a distance over which the lens for diopter correction is moved. In contrast, by disposing the lens group for diopter correction between the display section 1 and the optical path bending member 3, as in this embodiment, the thickness of the camera 100 can be reduced when compared to the case where the lens group for diopter correction is disposed between the optical path bending member 3 and the eye point EP.

It should be noted that, in the case where the cemented lens formed by a positive lens and a negative lens is used as the positive lens group for diopter correction, variation of chromatic aberration during diopter correction can be reduced. Further, by using the cemented lens set as the positive lens group for diopter correction, it is easy to move the positive lens group in an integrated manner. Alternatively, the positive lens group for diopter correction may be formed by a single lens, which is not cemented to another lens. In this case, a load imposed on a driving system for moving the lens can be reduced, and this contributes to the size reduction and weight reduction of the device.

It is preferred that the positive lens group for diopter correction is disposed nearest to the optical path bending member among positive lens groups present between the display section 1 and the optical path bending member 3. By using the lens group disposed in this position for the diopter correction, the diopter correction can effectively be achieved with a small amount of movement.

It is preferred that the conditional expression (1) below is satisfied:

$$1.60 < fc/fL < 2.50 \tag{1},$$

where fc is a focal length of the positive lens group for diopter correction, and fL is a focal length of the observation optical system 2.

The conditional expression (1) defines a preferred range of a value obtained by dividing the focal length of the positive lens group for diopter correction by the focal length of the entire observation optical system (in the case where the diopter is −1). If the value is below the lower limit of the conditional expression (1), the power of the positive lens group to be moved to achieve the diopter correction is excessively strong, and the variation of aberration, in particular, the variation of image tilt due to the diopter correction is increased. If the value is above the upper limit of the conditional expression (1), a required amount of movement of the positive lens group to achieve the diopter correction is increased, and this leads to increase of the entire length of the optical system, which is against the purpose of size reduction of the device.

Further, it is preferred to configure the view finder 10 to include one positive lens that is disposed between the optical path bending member 3 and the eye point EP and fixed relative to the optical path bending member 3. By disposing at least one positive lens between the optical path bending member 3 and the eye point EP, good imaging plane characteristics can be obtained.

Further, by fixing this positive lens, no space for movement of this lens is necessary and no driving mechanism for moving this lens is necessary, and this contributes to the thickness reduction of the camera 100. In the example shown in FIG. 1, the positive lens L5 that is fixed relative to the optical path bending member 3 is disposed between the optical path bending member 3 and the eye point EP. In the case where only one positive lens is disposed between the optical path bending member 3 and the eye point EP, both the size reduction of the device and the good imaging plane characteristics can be achieved.

In the case where one positive lens that is fixed relative to the optical path bending member 3 is disposed between the optical path bending member 3 and the eye point EP, it is preferred that the conditional expression (2) below is satisfied:

$$1.5 < fe/fL < 4.0 \tag{2},$$

where fe is a focal length of the positive lens, and fL is a focal length of the observation optical system 2.

The conditional expression (2) defines a preferred range of a value obtained by dividing the focal length of the one positive lens that is disposed between the optical path bending member 3 and the eye point EP and fixed relative to the optical path bending member 3 by the focal length of the entire observation optical system (in the case where the diopter is −1). If the value is below the lower limit of the conditional expression (2), the power of this positive lens is excessively strong, and instability of the image when the observer moves the eye during observation is increased. If the value is above the upper limit of the conditional expression (2), the power of this positive lens is excessively weak and this leads to increase of the entire length of the optical system, which is against the purpose of size reduction of the device.

Further, it is preferred to configure the view finder 10 such that a most display section-side lens has an absolute value of a radius of curvature of the eye point-side surface (surface on the eye point side) thereof smaller than that of the display section-side surface (surface on the display section side) thereof. This configuration facilitates providing a good diopter condition throughout from the center to the peripheral area of the image, and good imaging plane characteristics can be obtained.

For example, in the example shown in FIG. 1, the lens L1 that is the most display section-side lens is a plano-concave lens having a planer display section-side surface. In the case where the most display section-side lens has a planer display section-side surface, manufacturability is improved, and it is easier to ensure a good and stable diopter condition. Further, in the case where the most display section-side lens has a concave eye point-side surface, it is easier to maintain a good diopter condition throughout from the center to the peripheral area of the image.

It is preferred that the conditional expression (3) below is satisfied:

$$-1.5<fo/fL<-0.95 \qquad (3),$$

where fo is a focal length of the most display section-side lens, and fL is a focal length of the observation optical system 2.

The conditional expression (3) defines a preferred range of a value obtained by dividing the focal length of the most display section-side lens by the focal length of the entire observation optical system (in the case where the diopter is −1). As shown in the conditional expression (3), it is preferred that the most display section-side lens is a negative lens. In this case, it is even easier to maintain a good diopter condition throughout from the center to the peripheral area of the image. If the value is below the lower limit of the conditional expression (3), the power of the most display section-side lens is excessively weak, and this increases deviation of an angle that is formed between a principal ray of a light flux of a large angle of view and the display section 1 from the angle of 90 degrees. Therefore, in the case where the display section 1 is formed by a device that is angle dependent, problems of color reproducibility and shading may occur. If the value is above the upper limit of the conditional expression (3), a stronger diopter is provided at the peripheral area than at the center when viewed from the eye point.

Further, it is preferable that the observation optical system 2 includes a cemented lens formed by a positive lens and a negative lens cemented together. This allows size reduction and good chromatic aberration correction. This cemented lens may be movable during the diopter correction, as described above. Alternatively, in the view finder of the invention, this cemented lens may not be movable during the diopter correction.

In the case where the observation optical system 2 includes the cemented lens that is formed by a positive lens and a negative lens cemented together and is fixed and not movable during the diopter correction, it is preferred that the conditional expression (4) below is satisfied:

$$25<(vpk-vnk)/(Rck/fL)<40 \qquad (4),$$

where vpk and vnk are Abbe numbers with respect to the d-line of the positive lens and the negative lens forming the cemented lens, respectively, Rck is an absolute value of a radius of curvature of the cemented surface of the cemented lens, and fL is a focal length of the observation optical system 2.

The conditional expression (4) defines a preferred range of the degree of achromatism of the cemented lens that is not movable during the diopter correction. A degree of achromatism below the lower limit of the conditional expression (4) results in insufficient correction of the chromatic aberration. A degree of achromatism above the upper limit of the conditional expression (4) results in excessive correction of the chromatic aberration.

In the case where the observation optical system 2 includes the cemented lens that is formed by a positive lens and a negative lens cemented together and is movable during the diopter correction, it is preferred that the conditional expression (5) below is satisfied:

$$40<(vps-vns)/(Rcs/fL)<50 \qquad (5),$$

where vps and vns are Abbe numbers with respect to the d-line of the positive lens and the negative lens forming the cemented lens, respectively, Rcs is an absolute value of a radius of curvature of the cemented surface of the cemented lens, and fL is a focal length of the observation optical system 2.

The conditional expression (5) defines a preferred range of the degree of achromatism of the cemented lens that is movable during the diopter correction. A degree of achromatism below the lower limit of the conditional expression (5) results in insufficient correction of the chromatic aberration. A degree of achromatism above the upper limit of the conditional expression (5) results in excessive correction of the chromatic aberration.

Next, numerical examples of the view finder of the invention are described. FIGS. 3 to 12 show sectional views illustrating the configurations of view finders of Examples 1 to 10, respectively. All the view finders of Examples 1 to 10 include a bending optical system, where a prism 3P is used as the optical path bending member in Examples 1, 3 to 5 and 7 to 9, and a mirror 3M is used as the optical path bending member in Examples 2, 6 and 10. It should be noted that, in each of the examples shown in FIGS. 3 to 12, the bent optical path is shown in a developed view. Further, it is assumed in the examples shown in FIGS. 3 to 12 that the display section 1 has a rectangular information displaying area. For ease of understanding, a light flux when each of halves of lengths of the short side, the long side and the diagonal line of the rectangle is a so-called height of object at the display section 1 and a light flux from the center of the display section 1 are drawn in the same plane. It should be noted that the dimensions and position of the mirror 3M shown in each of FIGS. 4, 8 and 12 may not strictly correspond to the actual dimensions and position of the mirror. It is preferred that the direction of the optical path bent by the mirror 3M is appropriately set to fit the short side direction and the long side direction of the rectangular information displaying area of the display section 1. For example, a dimension in one direction of the mirror 3M may be determined based on a beam height of a light flux that corresponds to a half of the short side of the rectangle.

All the lens systems of Examples 1 to 10 are formed by five lenses including the lenses L1 to L5. In Examples 1 to 3, the cemented lens formed by the lens L2 and the lens L3 is not movable during the diopter correction, and the lens L4, which is a single lens, is moved along the optical axis direction to achieve the diopter correction. In Examples 4 to 10, the cemented lens formed by the negative lens L3 and the positive lens L4 is moved along the optical axis direction to achieve the diopter correction.

The symbol Ri (i=1, 2, 3, . . . ) shown in the sectional view of each example corresponds to "Ri" of lens data described below. The manners of description of lens data and aberration diagrams explained below with respect to Example 1 also apply to the other examples, and the same explanation is not repeated.

Tables 1 to 10 show lens data of the view finders of Examples 1 to 10. In the tables showing the lens data, each value in the column of "Si" represents a surface number of the i-th (i=1, 2, 3, . . . ) surface, where the display section-side surface of the element nearest to the display section is the 1st surface and the number is sequentially increased toward the eye point side; each value in the column of "Ri" represents a radius of curvature of the i-th surface; each value in the column of "Di" represents a surface interval between the i-th surface and the i+1-th surface along the optical axis Z; each value in the column of "Ndj" represents a refractive index with respect to the d-line (wavelength of 587.6 nm) of the j-th (j=1, 2, 3, . . . ) optical element, where the optical element nearest to the object is the 1st optical element and the number is sequentially increased toward the image side; and each value in the column of "vdj" represents an Abbe number with respect to the d-line of the j-th optical element. It should be noted that the positive values of the radius of curvature indicate that the shape of the surface is convex toward the display section side, and the negative values of the radius of curvature indicate that the shape of the surface is convex toward the eye point side.

In the lens data of Examples 1, 3 to 5 and 7 to 9, the prism serving as the optical path bending member is handled as a plane-parallel plate. In the lens data of Examples 2, 6 and 10, the description of the mirror serving as the optical path bending member is omitted. The "object distance" shown on the right side of each of Tables 1 to 10 is a distance from the lens L1 to the display section along the optical axis, and the "eye relief" shown on the right side of each Table is a distance from the lens L5 to the eye point EP along the optical axis. The unit of the values of the radius of curvature and the surface interval in the lens data is "mm". The numerical values shown in the tables below are rounded at predetermined decimal places.

Example 1

TABLE 1

| Si | Ri | Di | Ndj | vdj |
|---|---|---|---|---|
| 1 | ∞ | 0.80 | 1.84666 | 23.8 |
| 2 | 17.021 | 2.78 | | |
| 3 | 35.022 | 6.00 | 1.80400 | 46.6 |
| 4 | −12.000 | 1.00 | 1.84666 | 23.8 |
| 5 | −72.070 | 2.50 | | |
| 6 | 312.340 | 2.50 | 1.71300 | 53.9 |
| 7 | −25.881 | 2.50 | | |
| 8 | ∞ | 16.00 | 1.80400 | 46.6 |
| 9 | ∞ | 0.50 | | |

TABLE 1-continued

| Si | Ri | Di | Ndj | vdj |
|---|---|---|---|---|
| 10 | 38.371 | 2.20 | 1.71300 | 53.9 |
| 11 | −114.780 | | | |

Object distance 2.658
Eye relief 16.5

Example 2

TABLE 2

| Si | Ri | Di | Ndj | vdj |
|---|---|---|---|---|
| 1 | ∞ | 0.80 | 1.84666 | 23.8 |
| 2 | 17.021 | 2.78 | | |
| 3 | 35.022 | 6.00 | 1.80400 | 46.6 |
| 4 | −12.000 | 1.00 | 1.84666 | 23.8 |
| 5 | −72.070 | 2.50 | | |
| 6 | 312.340 | 2.50 | 1.71300 | 53.9 |
| 7 | −25.881 | 11.86 | | |
| 8 | 38.371 | 2.20 | 1.71300 | 53.9 |
| 9 | −114.780 | | | |

Object distance 2.658
Eye relief 16.5

Example 3

TABLE 3

| Si | Ri | Di | Ndj | vdj |
|---|---|---|---|---|
| 1 | ∞ | 1.00 | 1.84794 | 23.7 |
| 2 | 26.261 | 5.47 | | |
| 3 | −41.835 | 1.00 | 1.84597 | 23.5 |
| 4 | 15.000 | 6.50 | 1.83430 | 43.0 |
| 5 | −20.097 | 2.50 | | |
| 6 | 30.074 | 2.50 | 1.61888 | 60.4 |
| 7 | −121.540 | 3.19 | | |
| 8 | ∞ | 16.00 | 1.80400 | 46.6 |
| 9 | ∞ | 0.50 | | |
| 10 | −100.720 | 2.20 | 1.62663 | 60.1 |
| 11 | −33.260 | | | |

Object distance 1.700
Eye relief 16.5

Example 4

TABLE 4

| Si | Ri | Di | Ndj | vdj |
|---|---|---|---|---|
| 1 | ∞ | 1.00 | 1.88300 | 40.8 |
| 2 | 18.050 | 1.00 | | |
| 3 | 64.804 | 4.00 | 1.84666 | 23.8 |
| 4 | −29.509 | 2.50 | | |
| 5 | 460.510 | 1.00 | 1.92286 | 20.9 |
| 6 | 15.000 | 6.00 | 1.71300 | 53.9 |
| 7 | −21.432 | 2.50 | | |
| 8 | ∞ | 16.00 | 1.80400 | 46.6 |
| 9 | ∞ | 0.50 | | |
| 10 | −96.564 | 2.20 | 1.71300 | 53.9 |
| 11 | −19.702 | | | |

Object distance 1.700
Eye relief 16.5

Example 5

TABLE 5

| Si | Ri | Di | Ndj | vdj |
|---|---|---|---|---|
| 1 | ∞ | 1.00 | 1.88300 | 40.8 |
| 2 | 18.430 | 1.00 | | |
| 3 | 57.695 | 4.00 | 1.84666 | 23.8 |
| 4 | −27.159 | 2.50 | | |
| 5 | −1211.400 | 1.00 | 1.92286 | 20.9 |
| 6 | 15.000 | 6.00 | 1.71300 | 53.9 |
| 7 | −21.598 | 2.50 | | |
| 8 | ∞ | 16.00 | 1.80400 | 46.6 |
| 9 | ∞ | 0.50 | | |
| 10 | −91.097 | 2.20 | 1.71300 | 53.9 |
| 11 | −19.471 | | | |

Object distance 1.700
Eye relief 16.5

Example 6

TABLE 6

| Si | Ri | Di | Ndj | vdj |
|---|---|---|---|---|
| 1 | ∞ | 1.00 | 1.88300 | 40.8 |
| 2 | 17.938 | 1.00 | | |
| 3 | 74.535 | 4.00 | 1.88300 | 40.8 |
| 4 | −28.111 | 2.50 | | |
| 5 | 133.600 | 1.00 | 1.92286 | 20.9 |
| 6 | 15.000 | 6.00 | 1.71300 | 53.9 |
| 7 | −24.004 | 11.88 | | |
| 8 | −106.450 | 2.20 | 1.71300 | 53.9 |
| 9 | −20.029 | | | |

Object distance 1.700
Eye relief 16.5

Example 7

TABLE 7

| Si | Ri | Di | Ndj | vdj |
|---|---|---|---|---|
| 1 | ∞ | 1.00 | 1.83481 | 42.7 |
| 2 | 23.155 | 1.00 | | |
| 3 | −392.950 | 4.00 | 1.83481 | 42.7 |
| 4 | −28.901 | 2.50 | | |
| 5 | 50.742 | 1.00 | 1.92286 | 20.9 |
| 6 | 15.500 | 6.00 | 1.71300 | 53.9 |
| 7 | −35.149 | 2.50 | | |
| 8 | ∞ | 16.00 | 1.80400 | 46.6 |
| 9 | ∞ | 0.50 | | |
| 10 | 54.930 | 2.20 | 1.51680 | 64.2 |
| 11 | −23.544 | | | |

Object distance 1.700
Eye relief 16.5

Example 8

TABLE 8

| Si | Ri | Di | Ndj | vdj |
|---|---|---|---|---|
| 1 | ∞ | 1.00 | 1.88300 | 40.8 |
| 2 | 24.651 | 2.20 | | |
| 3 | −22.071 | 3.50 | 1.88300 | 40.8 |
| 4 | −16.119 | 2.50 | | |
| 5 | 43.197 | 1.00 | 1.92286 | 20.9 |
| 6 | 15.500 | 6.00 | 1.72916 | 54.7 |
| 7 | −41.466 | 2.50 | | |
| 8 | ∞ | 16.00 | 1.80400 | 46.6 |
| 9 | ∞ | 0.50 | | |
| 10 | 208.580 | 2.20 | 1.51680 | 64.2 |
| 11 | −21.490 | | | |

Object distance 1.700
Eye relief 16.5

Example 9

TABLE 9

| Si | Ri | Di | Ndj | vdj |
|---|---|---|---|---|
| 1 | ∞ | 1.00 | 1.88300 | 40.8 |
| 2 | 22.942 | 2.20 | | |
| 3 | −20.864 | 3.50 | 1.88300 | 40.8 |
| 4 | −15.477 | 2.50 | | |
| 5 | 40.950 | 1.00 | 1.92286 | 20.9 |
| 6 | 14.286 | 6.00 | 1.72916 | 54.7 |
| 7 | −38.584 | 2.50 | | |
| 8 | ∞ | 16.00 | 1.80518 | 25.4 |
| 9 | ∞ | 0.50 | | |
| 10 | 160.420 | 2.50 | 1.51680 | 642 |
| 11 | −21.041 | | | |

Object distance 1.700
Eye relief 16.5

Example 10

TABLE 10

| Si | Ri | Di | Ndj | vdj |
|---|---|---|---|---|
| 1 | ∞ | 1.00 | 1.88300 | 40.8 |
| 2 | 22.941 | 2.20 | | |
| 3 | −20.884 | 3.50 | 1.88300 | 40.8 |
| 4 | −15.455 | 2.50 | | |
| 5 | 40.998 | 1.30 | 1.92286 | 20.9 |
| 6 | 14.264 | 5.70 | 1.72916 | 54.7 |
| 7 | −38.540 | 11.86 | | |
| 8 | 160.390 | 2.50 | 1.51680 | 64.2 |
| 9 | −21.022 | | | |

Object distance 1.700
Eye relief 16.5

Aberration diagrams of the view finders of Examples 1 to 10 are shown at A to D in FIG. 13, at A to D in FIG. 14, at A to D in FIG. 15, at A to D in FIG. 16, at A to D in FIG. 17, at A to D in FIG. 18, at A to D in FIG. 19, at A to D in FIG. 20, at A to D in FIG. 21 and at A to D in FIG. 22, respectively.

Here, the aberration diagrams of Example 1 are explained as an example. The same explanation applies to the aberration diagrams of the other examples. FIG. 13 shows, at A to D, aberration diagrams of spherical aberration, astigmatism, distortion (distortion aberration) and lateral chromatic aberration (chromatic aberration of magnification), respectively, of the view finder of Example 1. Each aberration diagram is with respect to the d-line serving as the reference. The spherical aberration diagram and the lateral chromatic aberration diagram also show aberrations with respect to the F-line (wavelength of 486.1 nm) and the C-line (wavelength of 656.3 nm). In the astigmatism diagram, an aberration in the sagittal direction is shown in the solid line and an aberration in the tangential direction is shown in the dashed line.

An iris diameter (unit: mm) used to calculate the spherical aberration diagram is shown above the vertical axis of the spherical aberration diagram. That is, FIG. 13 shows, at A, a spherical aberration in the case where the iris diameter φ is 3.5 mm. The vertical axes of the astigmatism diagram, the distortion diagram and the lateral chromatic aberration diagram represent an output angle relative to the optical axis of the principal ray, and a value of the maximum output angle is shown above the vertical axis of each diagram. The horizontal axes of the spherical aberration diagram and the astigmatism diagram represent a diopter level, and the unit "D" means "diopter". The horizontal axis of the lateral chromatic aberration diagram represents an angle, where the unit is "minute".

Table 11 shows an angle θ formed between a principal ray of a light flux of the maximum angle of view and the display section 1, values relating to the conditional expressions (1) to (5), and corresponding values of the conditional expressions (1) to (5) of each of Examples 1 to 10. It should be noted that, when the principal ray is viewed in a direction from the display section 1 toward the eye point EP, and if the principal ray is directed in the same direction as a line normal to the display section 1, the angle θ is 90 degrees. If the principal ray is directed toward a position nearer to the center than the line normal to the display section 1, the angle θ takes a value smaller than 90 degrees. If the principal ray is directed toward a position nearer to the peripheral area than the line normal to the display section 1, the angle θ takes a value greater than 90 degrees. The values shown in Table 11 are with respect to the d-line.

a positive lens group for diopter correction disposed between the display section and the optical path bending member, the positive lens group being moved along an optical axis direction to achieve the diopter correction; and a cemented lens formed by a positive lens and a negative lens cemented together, the cemented lens being not movable during the diopter correction, wherein an angle formed between a principal ray of a maximum angle of view and the display section is in the range of 90±5 degrees, and wherein conditional expression (1) below is satisfied:

$$1.60 < fc/fL < 2.50 \quad (1),$$

where fc is a focal length of the positive lens group, and fL is a focal length of the observation optical system, and wherein conditional expression (4) below is satisfied:

$$25 < (vpk - vnk)/(Rck/fL) < 40 \quad (4),$$

where vpk and vnk are Abbe numbers with respect to the d-line of the positive lens and the negative lens forming the cemented lens, respectively, Rck is an absolute value of a radius of curvature of a cemented surface of the cemented lens, and fL is a focal length of the observation optical system.

2. The view finder as claimed in claim 1, comprising one positive lens disposed nearer to an eye point than the optical path bending member, the one positive lens being fixed relative to the optical path bending member,

TABLE 11

| | | Example 1 | Example 2 | Example 3 | Example 4 | Example 5 | Example 6 | Example 7 | Example 8 | Example 9 | Example 10 |
|---|---|---|---|---|---|---|---|---|---|---|---|
| | θ (degree) | 87.83 | 87.85 | 90.53 | 88.18 | 88.94 | 88.79 | 89.54 | 87.59 | 87.80 | 87.87 |
| | fL (mm) | 20.466 | 20.464 | 20.950 | 20.516 | 20.586 | 20.35 | 20.641 | 21.3 | 20.331 | 20.343 |
| | fc (mm) | 33.625 | 33.625 | 39.202 | 44.138 | 50.066 | 42.927 | 40.767 | 38.691 | 36.746 | 36.767 |
| | fe (mm) | 40.576 | 40.576 | 78.263 | 34.307 | 34.294 | 34.239 | 32.197 | 37.822 | 36.163 | 36.133 |
| | fo (mm) | −20.104 | −20.104 | −30.971 | −20.442 | −20.872 | −20.315 | −27.737 | −27.918 | −25.982 | −25.981 |
| | vpk | 46.6 | 46.6 | 43.0 | — | — | — | — | — | — | — |
| | vnk | 23.8 | 23.8 | 23.5 | — | — | — | — | — | — | — |
| | Rck | 12.000 | 12.000 | 15.000 | — | — | — | — | — | — | — |
| | vps | — | — | — | 53.9 | 53.9 | 53.9 | 53.9 | 54.7 | 54.7 | 54.7 |
| | vns | — | — | — | 20.9 | 20.9 | 20.9 | 20.9 | 20.9 | 20.9 | 20.9 |
| | Rcs | — | — | — | 15.000 | 15.000 | 15.000 | 15.500 | 15.500 | 14.286 | 14.264 |
| Expression (1) | fc/fL | 1.64 | 1.64 | 1.87 | 2.15 | 2.43 | 2.11 | 1.98 | 1.82 | 1.81 | 1.81 |
| Expression (2) | fe/fL | 1.98 | 1.98 | 3.74 | 1.67 | 1.67 | 1.68 | 1.56 | 1.78 | 1.78 | 1.78 |
| Expression (3) | fo/fL | −0.98 | −0.98 | −1.48 | −1.00 | −1.01 | −1.00 | −1.34 | −1.31 | −1.28 | −1.28 |
| Expression (4) | (vpk − vnk)/(Rck/fL) | 38.9 | 38.9 | 27.2 | — | — | — | — | — | — | — |
| Expression (5) | (vps − vns)/(Rcs/fL) | — | — | — | 45.1 | 45.3 | 44.8 | 43.9 | 46.4 | 48.1 | 48.2 |

The present invention has been described with reference to the embodiment and examples. However, the present invention is not limited to the above-described embodiment and examples, and various modifications may be made to the invention. For example, the values of the radius of curvature, the surface interval, the refractive index, the Abbe number, etc., of each lens component are not limited to the values shown in the numerical examples and may take other values.

What is claimed is:

1. A view finder comprising an observation optical system for enlarged observation of information displayed on a display section, wherein the observation optical system comprises:

an optical path bending member for bending an optical path;

wherein conditional expression (2) below is satisfied:

$$1.5 < fe/fL < 4.0 \quad (2),$$

where fe is a focal length of the positive lens, and fL is a focal length of the observation optical system.

3. The view finder as claimed in claim 2, comprising a most display section-side lens in the observation optical system, the most display section-side lens having an absolute value of a radius of curvature of an eye point-side surface thereof smaller than that of a display section-side surface thereof, wherein conditional expression (3) below is satisfied:

$$-1.5 < fo/fL < -0.95 \quad (3),$$

where fo is a focal length of the most display section-side lens, and fL is a focal length of the observation optical system.

4. The view finder as claimed in claim 2,
wherein conditional expression (5) below is satisfied:

$$40<(\nu ps-\nu ns)/(Rcs/fL)<50 \qquad (5)$$

where νps and νns are Abbe numbers with respect to the d-line of the positive lens and the negative lens forming the cemented lens, respectively, Rcs is an absolute value of a radius of curvature of a cemented surface of the cemented lens, and fL is a focal length of the observation optical system.

5. The view finder as claimed in claim 1, comprising a most display section-side lens in the observation optical system, the most display section-side lens having an absolute value of a radius of curvature of an eye point-side surface thereof smaller than that of a display section-side surface thereof,
wherein conditional expression (3) below is satisfied:

$$-1.5<fo/fL<-0.95 \qquad (3),$$

where fo is a focal length of the most display section-side lens, and fL is a focal length of the observation optical system.

6. The view finder as claimed in claim 5,
wherein conditional expression (5) below is satisfied:

$$40<(\nu ps-\nu ns)/(Rcs/fL)<50 \qquad (5)$$

where νps and νns are Abbe numbers with respect to the d-line of the positive lens and the negative lens forming the cemented lens, respectively, Rcs is an absolute value of a radius of curvature of a cemented surface of the cemented lens, and fL is a focal length of the observation optical system.

7. The view finder as claimed in claim 1,
wherein conditional expression (5) below is satisfied:

$$40<(\nu ps-\nu ns)/(Rcs/fL)<50 \qquad (5)$$

where νps and νns are Abbe numbers with respect to the d-line of the positive lens and the negative lens forming the cemented lens, respectively, Rcs is an absolute value of a radius of curvature of a cemented surface of the cemented lens, and fL is a focal length of the observation optical system.

8. A camera comprising the view finder as claimed in claim 1.

* * * * *